(12) United States Patent
Herrmann et al.

(10) Patent No.: US 12,535,132 B2
(45) Date of Patent: Jan. 27, 2026

(54) TRANSMISSION FOR A MOTOR VEHICLE

(71) Applicant: ZF Friedrichshafen AG, Friedrichshafen (DE)

(72) Inventors: Markus Herrmann, Scheidegg (DE); Florian Langenbacher, Tettnang (DE); Florian Staetter, Bodnegg (DE); Stefan Csajagi, Eriskirch (DE); Esben Madsen, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 677 days.

(21) Appl. No.: 17/892,485

(22) Filed: Aug. 22, 2022

(65) Prior Publication Data
US 2023/0073972 A1 Mar. 9, 2023

(30) Foreign Application Priority Data
Aug. 23, 2021 (DE) .......................... 102021209206.3

(51) Int. Cl.
*F16H 57/04* (2010.01)
*F03G 1/02* (2006.01)
(Continued)

(52) U.S. Cl.
CPC ....... *F16H 57/045* (2013.01); *F03G 7/06145* (2021.08); *F16H 57/0447* (2013.01);
(Continued)

(58) Field of Classification Search
CPC ............... F16H 57/045; F16H 57/0447; F16H 57/0409; F16H 57/0423; F16H 57/0435;
(Continued)

(56) References Cited

U.S. PATENT DOCUMENTS 2,964,132 A * 12/1960 Atkinson ................ F01D 25/18
137/563
4,245,593 A * 1/1981 Stein ........................ F02N 19/02
219/202

(Continued)

FOREIGN PATENT DOCUMENTS

| DE | 102006046850 A1 | 4/2007 |
| JP | 2020198675 A | 12/2020 |
| JP | 2021036160 A | 3/2021 |

OTHER PUBLICATIONS

German Search Report 10 2021 209 206.3, dated Mar. 25, 2022. (12 pages).

*Primary Examiner* — Henry Y Liu
(74) *Attorney, Agent, or Firm* — Dority & Manning, P.A.

(57) ABSTRACT

A transmission includes an oil sump and at least one oil bunker arranged separated from the oil sump within the transmission. The transmission includes a valve having a channel body, at least one sump port, at least one bunker port, and a mechanical actuating element. The channel body has at least one oil duct. The at least one oil duct connects the at least one bunker port to the at least one sump port. The mechanical actuating element is configured for temperature-dependently deforming to transfer the valve out of a closed position into at least one open position. The at least one oil bunker is connected to the oil sump via the valve when the valve is in the at least one open state. The at least one oil bunker is not connected to the oil sump via the valve when the valve is in the closed state.

2 Claims, 5 Drawing Sheets

(51) Int. Cl.
*F03G 7/06* (2006.01)
*F16K 31/00* (2006.01)
*G05D 7/01* (2006.01)

(52) U.S. Cl.
CPC ........... *F16K 31/002* (2013.01); *G05D 7/018* (2013.01); *F03G 1/024* (2021.08); *F03G 1/032* (2021.08)

(58) Field of Classification Search
CPC ... G05D 7/018; F16K 31/002; F03G 7/06145; F03G 1/024; F03G 1/032
USPC ........................................................ 184/6.12
See application file for complete search history.

(56) References Cited

U.S. PATENT DOCUMENTS

| | | | | |
|---|---|---|---|---|
| 4,658,665 | A * | 4/1987 | Strinzel | F16N 7/38 |
| | | | | 184/6.12 |
| 5,125,491 | A * | 6/1992 | Takikawa | F16D 35/022 |
| | | | | 192/82 T |
| 6,135,073 | A * | 10/2000 | Feucht | F01L 9/10 |
| | | | | 123/90.49 |
| 6,230,680 | B1 * | 5/2001 | Pirone | F01M 9/104 |
| | | | | 123/196 R |
| 6,915,772 | B2 * | 7/2005 | Carpenter | F02M 1/16 |
| | | | | 123/179.12 |
| 7,204,212 | B2 * | 4/2007 | Donaldson | F01L 9/10 |
| | | | | 123/90.27 |
| 7,265,978 | B2 * | 9/2007 | Suzuki | F16H 61/0006 |
| | | | | 174/15.1 |
| 7,624,660 | B2 * | 12/2009 | Morise | F16H 57/0421 |
| | | | | 361/689 |
| 8,632,689 | B2 * | 1/2014 | Merry | H01J 37/32522 |
| | | | | 137/625.46 |
| 9,328,817 | B2 * | 5/2016 | Yamashita | F16H 57/0423 |
| 9,713,955 | B2 * | 7/2017 | Kanada | F16H 3/728 |
| 9,784,150 | B2 * | 10/2017 | Marthaler | F01D 25/18 |
| 9,939,820 | B2 * | 4/2018 | Apostolides | G05D 7/0617 |
| 10,371,025 | B2 * | 8/2019 | Marthaler | F01M 1/02 |
| 10,494,964 | B2 * | 12/2019 | Heckman | F01M 11/0004 |
| 11,618,556 | B2 * | 4/2023 | Akahori | F16N 19/006 |
| | | | | 184/6.12 |
| 2004/0103864 | A1 * | 6/2004 | Carpenter | F02M 1/16 |
| | | | | 123/73 C |
| 2006/0054410 | A1 * | 3/2006 | Nakamura | F16H 57/0447 |
| | | | | 184/6.12 |
| 2007/0078036 | A1 * | 4/2007 | Morise | F16H 61/0009 |
| | | | | 475/159 |
| 2010/0025177 | A1 * | 2/2010 | Fukushima | F16D 35/023 |
| | | | | 192/58.68 |
| 2013/0105442 | A1 * | 5/2013 | Merry | H01J 37/32522 |
| | | | | 137/625.65 |
| 2015/0053505 | A1 * | 2/2015 | Klowak | F01M 11/061 |
| | | | | 184/105.1 |
| 2015/0285369 | A1 * | 10/2015 | Benson | F16K 31/002 |
| | | | | 251/11 |
| 2018/0298797 | A1 * | 10/2018 | Heckman | F01M 1/16 |
| 2020/0122824 | A1 * | 4/2020 | Akahori | F16H 57/0435 |
| 2021/0102484 | A1 * | 4/2021 | Klowak | F01M 11/061 |
| 2023/0137698 | A1 * | 5/2023 | Akahori | F16H 57/046 |
| | | | | 184/6.12 |

* cited by examiner

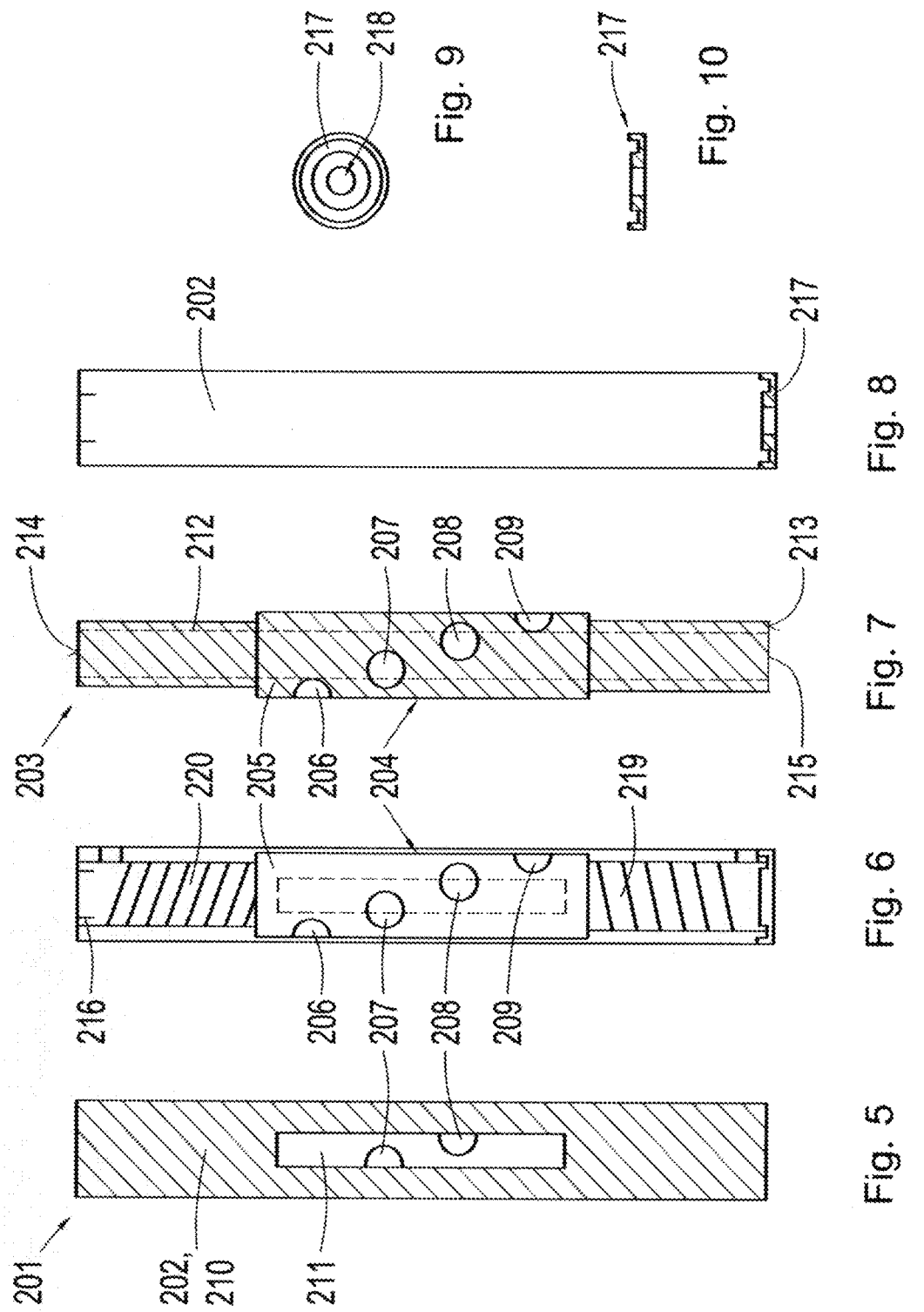

TRANSMISSION FOR A MOTOR VEHICLE

CROSS-REFERENCE TO RELATED APPLICATION

The present application is related and claims priority to 102021209206.3 filed in the German Patent Office on Aug. 23, 2021, which is incorporated by reference in its entirety for all purposes.

FIELD OF THE INVENTION

The invention relates generally to a transmission for a motor vehicle.

BACKGROUND

Oil is utilized as a fluid in transmissions of motor vehicles for actuating hydraulic components and for lubrication and for cooling. The oil is typically stored in the "oil sump" via an oil pan mounted in the lower area of the transmission. This storage, which is also referred to as a "wet sump," is the prior art for transmissions. In the combustion engine sector, in particular in the case of sporty vehicles or vehicles that are highly suitable for off-road use, "dry sump" storage is also utilized, in which the fluid is conveyed out of the main reservoir into an intermediate reservoir before the fluid is further conveyed to the consumers. This has the advantage that strong fluctuations of the oil reservoir can be buffered in the main reservoir.

Oil level problems can arise in transmissions across the entire temperature range. Due to the temperature-dependent change in volume of the hydraulic oil in the transmission, it can be difficult to set the optimal amount of oil, in particular in highly integrated transmission versions. Temperature-dependent fluctuations of the oil volume can result in massive changes in the oil level with effects on the function and the efficiency of the transmission. If a low temperature is defined for the purpose of setting the oil level, then, above the temperature, the oil level may increase due to the increase in volume to such an extent that oil enters the rotating parts of the transmission, resulting in oil foaming and an increase in drag losses. In contrast, if a high temperature is defined for the purpose of the setting, the oil volume shrinks as the transmission oil temperature decreases. The oil level may drop below a critical mark and cause air suction, which results in shift quality complaints.

SUMMARY OF THE INVENTION

Example aspects of the present invention provide a technology that takes the above-described problems into account and, due to which, in particular, temperature-dependent fluctuations of the oil level in the oil sump do not result in a critical or inefficient state.

According to example aspects of the present invention, a temperature-dependently controlled intermediate buffering of a superfluous oil volume at higher temperatures is provided in a transmission of a motor vehicle. The intermediate buffering can be implemented, in particular, by additional oil reservoirs (bunker chambers) outside the transmission oil pan. A mechanically actuated valve, which influences an oil return from bunker chambers to a transmission oil sump, is provided for temperature-dependently controlling the intermediately buffered amount of oil. Openings, which can be located at different levels, can be opened or closed as a function of the transmission temperature. Thus, a defined amount of oil is temperature-dependently conveyed out of the bunker/reservoir into the sump.

In this sense, according to a first example aspect of the invention, a transmission for a motor vehicle is provided. The transmission includes an oil sump, which is arranged, in particular, in a bottom area of the transmission, and at least one oil bunker, which is arranged separated from the oil sump within the transmission. The transmission also includes a valve having a channel body, which includes at least one sump port, at least one bunker port, and a mechanical actuating element. The valve is installed, in particular upright, into a housing of the transmission, preferably at a collection point of outflows of multiple oil bunkers.

The channel body has at least one oil duct, which connects the at least one bunker port to the at least one sump port. The mechanical actuating element is configured for temperature-dependently deforming (for example, by way of the mechanical actuating element contracting as temperatures drop) such that the mechanical actuating element transfers the valve from a closed state into at least one open state. In addition, the mechanical actuating element can be configured for temperature-dependently deforming (for example, by way of the mechanical actuating element expanding as temperatures rise) such that the mechanical actuating element transfers the valve from the at least one open state into the closed state.

The at least one oil bunker is connected to the oil sump via the at least one bunker port, the at least one oil duct, and the at least one sump port when the valve is in the at least one open state. In this case, in particular at falling or relatively low temperatures, oil flows out of the bunkers via the valve into the oil sump. When the valve is in the closed state, however, the at least one oil bunker is not connected to the oil sump via the valve. In this case, in particular at rising or relatively high temperatures, oil does not flow out of the bunkers via the valve into the oil sump. Instead, the at least one oil bunker can be filled when temperatures are rising.

In one example embodiment, the valve includes a first sump port, a second sump port, a first bunker port, and a second bunker port, wherein the channel body includes a first oil duct and a second oil duct. The first oil duct connects the first bunker port to the first sump port and the second oil duct connects the second bunker port to the second sump port.

The mechanical actuating element in this example embodiment is configured for deforming when a first temperature is fallen below such that the mechanical actuating element transfers the valve from the closed state into a first open state. When a second temperature, which is below the first temperature, is fallen below, the mechanical actuating element deforms such that the mechanical actuating element transfers the valve from the first open state into a second open state. When the valve is in the first open state, the at least one oil bunker is connected to the oil sump via the first bunker port, the first oil duct, and the first sump port. Alternatively or additionally, the at least one oil bunker is connected to the oil sump via the second bunker port, the second oil duct, and the second sump port when the valve is in the second open state. In this case, more oil is drained out of the at least one bunker via the valve into the oil sump.

Multiple levels can be easily implemented via a geometry of the oil ducts and their arrangement with respect to one another. In one example embodiment, this can be carried out by arranging the first bunker port above the second bunker port when the valve is installed in the transmission. Therefore, the two bunker ports are arranged at different levels when the valve is installed in the transmission. As a result, for example, different fill levels can be utilized in order to drain oil out of the bunkers into the oil sump via the bunker ports of the valve, which are arranged at different heights. When the valve is in the second open state, the at least one oil bunker can be connected to the oil sump via the first bunker port, the first oil duct, and the first sump port, as well as via the second bunker port, the second oil duct, and the second sump port.

In one advantageous example variant, the channel body can be a housing-affixed, cylindrical hollow body, in the lateral surface of which the at least two oil ducts are formed via indentations. These ducts can be connected, for example, to outlet openings of the oil bunkers via at least one opening in the transmission housing. At a lower end of the cylindrical channel body, the sump ports, which can be formed by openings in the oil ducts, can be connected to a drain hole to the oil sump in an angle-dependent manner via a temperature-dependently actuated rotary disk. The channel body can be designed to be closed at least to a large extent in the area of the rotary disk, wherein a lower end face of the channel body is utilized for sealing the oil ducts with respect to the rotary disk. A temperature-dependent displacement, in particular an angular displacement, of the rotary disk is carried out via the mechanical actuating element, which can be, in particular, at least one spring element made of a bimetal. The mechanical actuating element can expand as the temperature increases and contract as the temperature decreases and, in the process, turn the rotary disk, in particular such that the rotary disk moves either out of a closed position into at least one of the open positions, or vice versa. The sealing of the individual oil ducts with respect to one another and toward the oil sump can be carried out purely via the end-face surfaces of the rotary disk and of the channel body without an additional sealing material. A pressing of the two surfaces toward each other can be set in a defined manner, for example, via an inserted O-ring at the upper end, in particular at an upper end face of the channel body. In this way, a tolerance compensation of the length tolerances at the components is also possible within certain limits.

In this sense, the transmission in one further example embodiment includes a first oil bunker, a second oil bunker, a transmission housing, and a rotary disk, wherein the channel body has a cylindrical shape, and wherein the channel body is rotationally fixed to the transmission housing. The bunker ports are connected to the oil bunkers via at least one opening in the transmission housing, wherein an outer lateral surface of the channel body has a first indentation, which forms the first oil duct. In addition, the outer lateral surface of the channel body has a second indentation, which forms the second oil duct. The mechanical actuating element is fixedly connected to the rotary disk and configured for temperature-dependently deforming such that the mechanical actuating element turns the rotary disk from a closed position into a first open position and from the first open position into a second open position and, in particular, from the second open position back into the first open position and from the first open position back into the closed position. When the rotary disk is in the first open position, the valve is in the first open state, wherein the rotary disk opens the first sump port such that the first sump port is connected to the oil sump. In this case, oil can flow out of at least one of the two bunkers into the oil sump via the first bunker port, the first oil duct, and the first sump port. When the rotary disk is in the second open position, the valve is in the second open state, wherein the rotary disk opens the second sump port such that the second sump port is connected to the oil sump. In this case, oil can flow out of at least one of the two bunkers into the oil sump via the second bunker port, the second oil duct, and the second sump port. Additionally, the first sump port can also remain open when the rotary disk is in the second open position, so that oil can continue to flow out of at least one of the two oil bunkers into the oil sump via the first bunker port, the first oil duct, and the first sump port. The advantages of this example embodiment lie in the fact, in particular, that particularly few moving components are necessary. In addition, the valve gets by with few moving masses and there are only small friction surfaces, resulting in a lower susceptibility to contaminants.

The mechanical actuating element can be, for example, a bimetal spring, which can be designed, for example, as a strip or a spiral spring, or can be a wax-based expansion element. A coiled spiral spring, which generates a torque by changing length, is particularly favorable with respect to installation space. The disk can also be rotated, however, via a lever mechanism with an actuating element having a changing length (bimetal strip, wax-based expansion element, etc.). In this sense, the mechanical actuating element in one example embodiment includes a wound bimetal spiral spring, which is configured for generating a torque via a change of length, the torque acting upon the rotary disk. Alternatively or additionally, the mechanical actuating element can include a bimetal strip or a wax-based expansion element, the length of which changes as the temperature changes. The bimetal strip or the wax-based expansion element having a changing length can be configured for generating a torque via a lever mechanism, which acts upon the rotary disk.

The channel body can optionally adjust a maximum level (overflow function) via an upper, open end of the channel body or an overflow channel in the lateral surface. In this sense, the channel body in one example embodiment includes an overflow duct having an input-side port and having an output-side port, wherein the input-side port of the overflow duct is arranged above the bunker ports and is connected to at least one of the bunkers. The output-side port of the overflow duct is connected to the oil sump and, in fact, regardless of which position the rotary disk is in.

One further valve example variant includes a hollow cylindrical valve housing and a hollow cylindrical channel body, including a piston, accommodated therein. By way of a filling of the hollow cylindrical piston, the mechanical actuating element can be heated or cooled and turn the piston. In conjunction with the turning motion, an oil through-flow out of the oil bunker via the valve into the oil sump opens, closes, or at least changes by way of openings in the piston being adapted to an opening in the valve housing. The oil level can also be adjusted as the opening of the piston increases or decreases.

In another valve example variant, the housing can be a hollow turned part having openings at both ends. At the upper end, the diameter of the opening can be slightly smaller than an inner diameter of the channel body and manufactured with an edge that holds the channel body in place from the inside. Therefore, the through-flow as well as the mounting of the channel body are secured. At the other (lower) end, an internal thread can be provided, which corresponds to an external thread of a mounting plug. The channel body can also be a hollow turned part having openings at both ends. At the upper end, the piston can fit over the manufactured edge of the valve housing and, thereby, close an opening to a chamber having the mechanical actuating element. At the bottom, the channel body can fit over a plug and turn in a fixed position. A piston of the channel body can be formed by a radial shoulder of the channel body in the middle. The piston can be utilized as the seal between an inner housing wall and the channel body. The piston has multiple holes (openings, for example, four each), which ensure that there is a rising or falling opening to the at least one oil bunker and by which the oil level can be adjusted depending on the temperature.

In this sense, the valve in one further example embodiment has a hollow cylindrical valve housing. The channel body of the valve includes a piston, which is rotatably accommodated within the valve housing and has an outer lateral surface, which forms at least one bunker port. The valve housing has a lateral surface, which, at the level of the at least one bunker port, has a housing opening, which is connected to the at least one oil bunker on the outer side of the lateral surface, and which can be connected to the at least one bunker port on the inner side of the lateral surface. The mechanical actuating element is configured for temperature-dependently deforming such that the mechanical actuating element can turn the piston out of the closed position into at least one open position. The valve is in the closed state when the piston is in the closed position, wherein the valve housing covers the at least one bunker port such that the at least one bunker port is not connected via the housing opening to the at least one bunker and oil cannot flow out of the at least one bunker via the valve into the oil sump. The valve is in the at least one open state when the piston is in the at least one open position, wherein the at least one bunker port is connected to the at least one bunker via the housing opening such that the at least one bunker port is connected to the at least one bunker.

Due to a filling of the hollow cylindrical piston, in particular, two bimetal springs (springs of equal size that operate in opposite directions) are heated and cooled and turn the piston. The two bimetal springs are, in particular, cylindrical springs, which are wound around the channel body in the longitudinal direction in order to minimize the effect of dirt and to optimize the contact surface (temperature transfer) to the channel body and to the oil. In this sense, the mechanical actuating element in one example embodiment includes two bimetal cylindrical springs, wherein the two bimetal cylindrical springs at least partially enclose the channel body, are rotationally fixed to the channel body, and have the same size and act upon the channel body in opposite directions. In addition, the two bimetal cylindrical springs are configured for temperature-dependently deforming such that the two bimetal cylindrical springs jointly turn the channel body from the closed position into the at least one open position and also, in particular, from the at least one open position back into the closed position.

In order to connect the at least one bunker port to a sump port arranged on the end face, the channel body can advantageously form at least one oil duct in the interior of the channel body. In this sense, the valve housing has, on a sump port end face (in particular the lower end face of the valve housing), an end-face opening, which forms the at least one sump port, wherein the channel body has an inner longitudinal bore, which forms the at least one oil duct and, starting from the end-face opening, extends at least to the at least one bunker port.

In one further example variant of the valve, the channel body can be temperature-dependently turned, in particular, via two bimetal coils. The valve housing is designed such that two openings are closed one after the other. Inlet holes in the transmission housing can be configured such that a first intake of oil out of the at least one oil bunker impacts the valve in the axial direction in the middle, wherein a second intake of oil out of the at least one oil bunker reaches the valve radially. The channel body has two bunker ports, by which three oil levels can be set in the oil bunkers at the transmission housing.

In this sense, the valve has a hollow cylindrical valve housing, wherein the channel body is rotatably accommodated within the valve housing and has a cylindrical portion that forms a first bunker port and a second bunker port. The channel body forms, in the interior of the channel body, a first oil duct, which connects the first bunker port to a first sump port, and a second oil duct, which connects the second bunker port to a second sump port. The valve is shaped such that oil out of the at least one oil bunker that impacts the valve in the axial direction is directed to the first bunker port and oil out of the at least one oil bunker that impacts the valve in the radial direction is directed to the second bunker port.

The mechanical actuating element is configured for temperature-dependently deforming such that the mechanical actuating element can turn the channel body from a closed position into at least one open position and, in particular, from the at least one open position back into the closed position. The valve is in the closed state when the channel body is in the closed position, wherein the valve housing covers both bunker ports such that neither of the two bunker ports is connected to the at least one bunker and oil cannot flow out of the at least one bunker via the valve into the oil sump. By contrast, the valve is in the at least one open state when the channel body is in the at least one open position, wherein the at least one bunker port is connected to the at least one bunker via the valve housing such that oil can flow out of the at least one bunker via the valve into the oil sump.

BRIEF DESCRIPTION OF THE DRAWINGS

Exemplary embodiments of the invention are explained in greater detail in the following with reference to the diagrammatic drawing, wherein identical or similar elements are labeled with the same reference character, wherein FIG. 5 shows a side view of a second exemplary embodiment of a valve for the transmission according to FIG. 1, wherein the valve has a valve housing, a channel body with a piston, and two spring elements, FIG. 6 shows a side view of the channel body with a piston and the two spring elements according to FIG. 5, FIG. 7 shows a side view of the channel body with the piston according to FIG. 5, FIG. 8 shows a side view of the valve housing according to FIG. 5, FIG. 9 shows a top view of a plug of the valve according to FIG. 5, FIG. 10 shows a side view of the plug according to FIG. 9.

DETAILED DESCRIPTION

Figure 2:
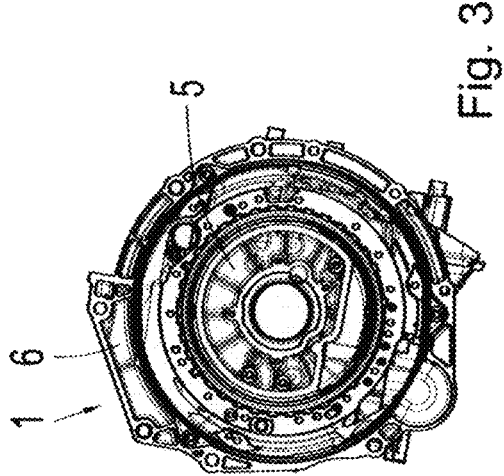
FIG. 2 shows an alternative side view of the transmission according to FIG. 1.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
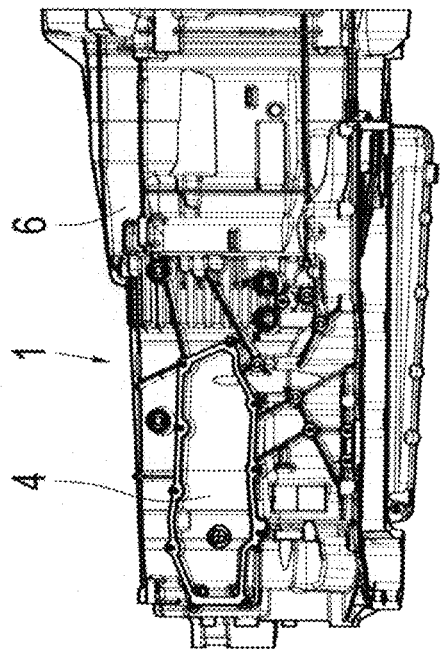
FIG. 1 shows a side view of an exemplary embodiment of a transmission according to example aspects of the invention.
Figure 3:
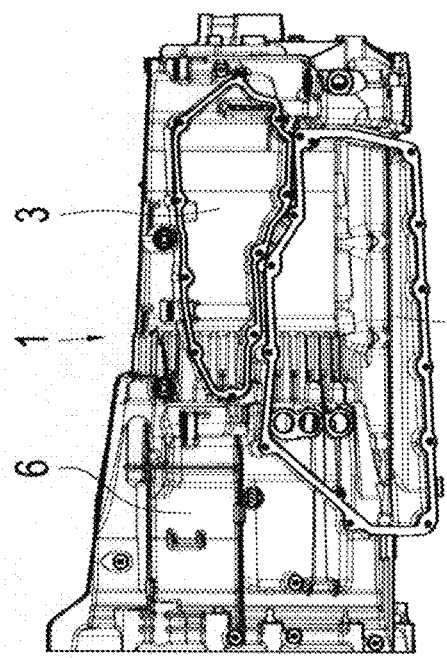
FIG. 3 shows a front view of the transmission according to FIG. 1.

FIGS. 1 through 3 show a transmission 1, which is an automatic transmission in the exemplary embodiment shown. The transmission 1 is intended to be installed in a drive train (not represented) of a motor vehicle. In order to supply the automatic transmission 1 with hydraulic fluid in the form of oil, in particular for shifting, for lubrication, and for cooling, a transmission housing 6 of the transmission 1 has an oil sump 2 and three oil bunkers 3, 4, and 5 separated from the oil sump 2. The oil sump 2 and the oil bunkers 3 through 5 are hollow spaces in which oil can be stored. The oil sump 2 is arranged in a bottom area of the transmission 1. A first oil bunker 3 is arranged above the oil sump 2 on an input side of the transmission 1. A second oil bunker 4 is arranged above the oil sump 2 on an output side of the transmission 1. In addition, a third oil bunker 5 is arranged in the area of an end face on the output side of the transmission 1.

Depending on a temperature of the transmission 1, oil can be conveyed out of the oil sump 2 into the oil bunkers 3 through 5. This can take place, in particular, for the case in which the temperature of the transmission 1 increases or exceeds certain limit values. In addition, oil can be conveyed out of the oil bunkers 3 through 5 back into the oil sump 2, also as a function of the temperature of the transmission 1. This can take place, in particular, for the case in which the temperature of the transmission 1 decreases or falls below certain limit values.

Figure 4:
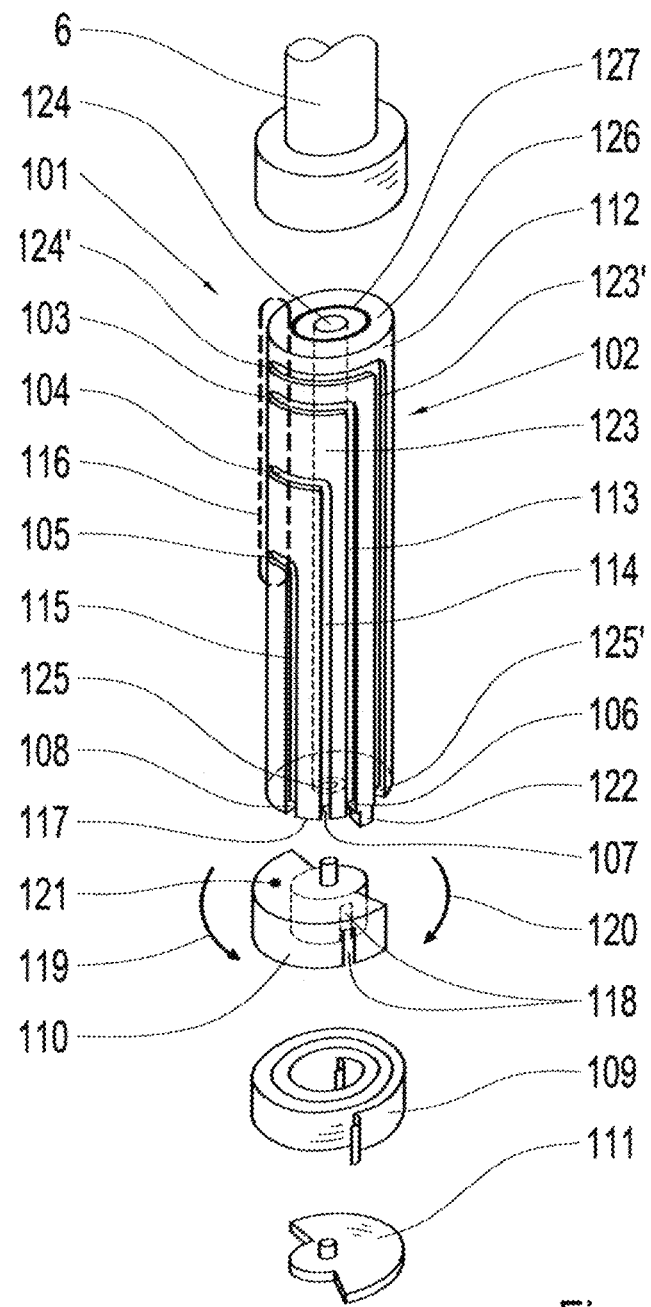
FIG. 4 shows a perspective exploded representation of a first exemplary embodiment of a valve for the transmission according to FIG. 1.

A mechanically actuated valve 101, which is shown, for example, in FIG. 4 and influences the return of oil out of the oil bunkers 3 through 5 into the oil sump 2, is utilized for the temperature-dependent open-loop control of the amount of oil intermediately stored in the oil bunkers 3 through 5. Valve openings and connections, which are located at different levels, can be opened or closed as a function of a temperature within the transmission 1. Therefore, a defined amount of oil can be temperature-dependently conveyed out of the bunkers 3 through 5 into the oil sump 2, as described in greater detail in the following.

The valve 101 is fixedly installed into the transmission housing 6, in particular in a rotationally fixed manner, in an upright position of the valve 101, as shown in FIG. 4. FIG. 4 shows a portion of the transmission housing 6 that encompasses the valve 101. An installation site of the valve 101 is located, in particular, at a collection point at which drain lines of the three oil bunkers 3 through 5 can converge. The valve 101 according to FIG. 4 includes, in the exemplary embodiment shown, in particular, a channel body 102, a first bunker port 103, a second bunker port 104, a third bunker port 105, a first sump port 106, a second sump port 107, a third sump port 108, a mechanical actuating element 109, a rotary disk 110, and a closing base 111.

The channel body 102 is designed in the shape of a cylinder. The channel body 102 has an outer lateral surface 112. The three bunker ports 103 through 105 are arranged, spaced apart from one another, at different levels on the outer lateral surface 112. The first bunker port 103 is located closest to the top (highest level). The third bunker port 105 is located closest to the bottom (lowest level). The second port 104 is arranged, with respect to height, between the first bunker port 103 and the third bunker port 105 at a level in the middle.

The outer lateral surface 112 of the channel body 102 has three indentations 113 through 115. A first indentation 113 extends between the first bunker port 103 and the first sump port 106 such that the first indentation 113 forms a first oil duct, which connects the first bunker port 103 to the first sump port 106. A second indentation 114 extends between the second bunker port 104 and the second sump port 107 such that the second indentation 114 forms a second oil duct, which connects the second bunker port 104 to the second sump port 107. Moreover, a third indentation 115 extends between the third bunker port 105 and the third sump port 108 such that the third indentation 115 forms a third oil duct, which connects the third bunker port 105 to the third sump port 108. The three sump ports 106 through 108 are arranged on a lower end face 117 of the cylindrical channel body 102.

The transmission housing 6 has a housing opening 116 in the area of the three bunker ports 103 through 105. The housing opening 116 connects the three bunker ports 103 through 105 to outlet openings in the three oil bunkers 3 through 5 (FIG. 1) or to the above-described collection point at which drain lines of the three oil bunkers 3 through 5 can converge. Alternatively to the common housing opening 116 for the three bunker ports 103 through 105, for example, three individual housing openings can also be provided for the three bunker ports 103 through 105.

At the lower end of the cylindrical channel body 102, the sump ports 106 through 108 are connected to a drain hole to the oil sump 2 in an angle-dependent manner via the temperature-dependently actuated rotary disk 110. The rotary disk 110, in cross section, has the shape of a partial circle. The mechanical actuating element 109 in the exemplary embodiment shown is a spiral spring, which can be made, in particular, of a bimetal. The spiral spring 109 is wound up, wherein opposite ends of the spiral spring 109 are fastened on the rotary disk 110. This takes place by two spring fixations 120 of the rotary disk 110. The height of the rotary disk 110 approximately corresponds, in the exemplary embodiment shown, to the height of the spiral spring 109. The rotary disk 110 can be designed to be hollow such that the rotary disk 110 can accommodate at least a portion of the spiral spring 109. Alternatively to the above-described spiral spring 109, a bimetal strip or a wax-based expansion element, the length of which changes as the temperature changes, can also be utilized. The aforementioned alternative mechanical actuating elements are configured for generating an above-described torque via a lever mechanism, which acts upon the rotary disk 110.

The spiral spring 109 deforms when a temperature of spiral spring 109 changes. As the temperature of the spiral spring 109 increases, the spiral spring 109 expands. As the temperature decreases, the spiral spring 109 contracts. The spiral spring 109 is fastened on the rotary disk 110 and is arranged in relation to the rotary disk 110 such that the spiral spring 109 generates a torque, which acts upon the rotary disk 110. Due to the torque, the rotary disk 110 is turned in a first direction of rotation 119 (counterclockwise according to FIG. 4) when the temperature increases and the spiral spring 109 expands. When the temperature of the spiral spring 109 decreases and the spiral spring 109 contracts, the torque acts in the opposite direction such that the spiral spring 109 turns the rotary disk 110 in a second direction of rotation 120 (clockwise according to FIG. 4), which is opposite the first direction of rotation 119.

The rotary disk 110 can be turned in the first direction of rotation 119 to such an extent that the rotary disk 110 is in a closed position, which is shown in FIG. 4. When the rotary disk 110 is in the closed position, an upper closing surface 121 of the rotary disk 110, which faces the lower end face 117 of the channel body 102, closes the first sump port 106, the second sump port 107, and the third sump port 108 in the direction of the oil sump 2. As a result, oil cannot flow out of the three bunkers 3 though 5 via the valve 101 into the oil sump 2. The valve 101 is therefore in a closed state. The channel body 102 has a stop 122 protruding from the lower end face 117 in the axial direction, which the rotary disk 110 impacts when this is in the closed position. The stop 122 prevents the rotary disk 110 from turning further in the first direction of rotation 119 past the closed position.

Starting from the closed position, the rotary disk 110 can be turned in the second direction of rotation 120 to such an extent that the rotary disk 110 is in a first open position. When the rotary disk 110 is in the first open position, the upper closing surface 121 of the rotary disk 110 continues to close the second sump port 107 and the third sump port 108 in the direction of the oil sump 2, whereas the upper closing surface 121 of the rotary disk 110 now opens the first sump port 106 in the direction of the oil sump 2. As a result, oil can flow out of at least one of the three bunkers 3 through 5 via the first bunker port 103, the first oil duct 113, and the first sump port 106 of the valve 101 into the oil sump 2. The valve 101 is then in a first open state.

Starting from the first open position, the rotary disk 110 can be turned in the second direction of rotation 120 to such an extent that the rotary disk 110 is in a second open position. When the rotary disk 110 is in the second open position, the upper closing surface 121 of the rotary disk 110 continues to close the third sump port 108 in the direction of the oil sump 2, whereas the upper closing surface 121 of the rotary disk 110 now opens the first sump port 106 and the second sump port 107 in the direction of the oil sump 2. As a result, oil can flow out of at least one of the three bunkers 3 through 5 via the first bunker port 103, the first oil duct 113, and the first sump port 106 of the valve 101 and via the second bunker port 104, the second oil duct 114, and the second sump port 107 of the valve 101 into the oil sump 2. The valve 101 is then in a second open state.

Starting from the second open position, the rotary disk 110 can be turned in the second direction of rotation 120 to such an extent that the rotary disk 110 is in a third open position. When the rotary disk 110 is in the third open position, the upper closing surface 121 of the rotary disk 110 opens the first sump port 106, the second sump port 107, and the third sump port 108 in the direction of the oil sump 2. As a result, oil can flow out of at least one of the three bunkers 3 through 5 via all three bunker ports 103 through 105, all three oil ducts 113 through 115, and all three sump ports 106 through 108 of the valve 101 into the oil sump 2. The valve 101 is then in a third open state.

According to example aspects of the valve 101 according to FIG. 4, when the temperature of the transmission 1 increases, the temperature of the spiral spring 109 also increases, the spiral spring 119 expands, and the rotary disk 110 turns in the first direction of rotation 119 in the direction of the closed position, and so more and more sump ports 106 through 108 are closed, one after the other, in the direction of the oil sump 2. Conversely, when the temperature of the transmission 1 decreases, the temperature of the spiral spring 109 also decreases, and so the spiral spring 109 contracts and the rotary disk 110 turns in the second direction of rotation 120 in the direction of the third open position, and so more and more sump ports 106 through 108 are opened, one after the other, in the direction of the oil sump 2.

The channel body 102 in the exemplary embodiment shown is hollow cylindrically shaped and has a central longitudinal bore 123, which forms an overflow duct having an input-side overflow port 124 and having an output-side overflow port 125. The input-side overflow port 124 of the overflow duct 123 is arranged on an upper end face 126 of the channel body 102 above the three bunker ports 103 through 105. The input-side overflow port 124 is connected to at least one of the oil bunkers 3 through 5 via the housing opening 116. If oil out of the at least one oil bunker 3 through 5 is present at the housing opening 116 at a higher level than the upper end face 126 of the channel body 102, the oil then flows via the input-side overflow port 124, via the overflow duct 123, and via the output-side overflow port 125 into the oil sump 2. The oil sump 2 is connected to the output-side overflow port 125 regardless of which position the rotary disk is in. Therefore, a maximum level can be optionally set (overflow function) via the upper, open end of the hollow cylindrical channel body 102.

Alternatively to the above-described central overflow duct 123, an alternative overflow duct 123' can also be designed, for example, as a fourth oil duct, which, similarly to the first three oil ducts 103 through 105, is formed by an indentation in the outer lateral surface 112 of the channel body 102. An input-side overflow port 124' of the overflow duct 123' is arranged on the outer lateral surface 112 of the channel body 102 above the three bunker ports 103 through 105. An output-side overflow port 125' of the overflow duct 123' is arranged in the area of the lower end face 117 of the channel body 102 on the outer lateral surface 112 of the channel body 102. The output-side overflow port 125' of the overflow duct 123' is connected to the oil sump 2 regardless of which position the rotary disk 110 is in. This overflow duct 125' is therefore always open toward the bottom, i.e., the rotary disk 110 never seals this overflow duct 125' and ensures the oil outflow in all rotational positions. The input-side overflow port 124' is connected to at least one of the oil bunkers 3 through 5 via the housing opening 116. If oil out of the at least one oil bunker 3 through 5 is present at the housing opening 116 at a higher level than the input-side overflow port 124', the oil then flows via the input-side overflow port 124', via the overflow duct 123', and via the output-side overflow port 125' into the oil sump 2.

In the exemplary embodiment shown in FIG. 4, a sealing of the individual oil ducts 103 through 105 with respect to one another and toward the oil sump 2 takes place purely via the upper closing surface 121 of the rotary disk 110 on the one hand, and, on the other hand, via the lower end face 117 of the channel body 102, and, in fact, without additional sealing material. A pressing of the two surfaces 117, 121 toward each other can be set in a defined manner, for example, via an O-ring 127 inserted in a groove in the upper end face 126 at the upper end of the channel body 102. In this way, a tolerance compensation of the length tolerances at the components is also possible within certain limits.

FIGS. 5 through 10 show an alternative valve 201 for the temperature-dependent open-loop control of the amount of oil intermediately stored in the oil bunkers 3 through 5 according to FIGS. 1 through 3. The valve 201 has a hollow cylindrical valve housing 202, which encompasses a channel body 203 having a piston 204. The channel body 203 is rotatably accommodated, with the piston 204, within the valve housing 202. The valve housing 202 is fixedly installed into the transmission housing (not shown in FIG. 5, cf. FIGS. 1 through 3), in particular in a rotationally fixed manner, in the upright position of the valve 201, which is shown in FIGS. 5 through 8. An installation site of the valve 201 is located, in particular, at a collection point at which drain lines of the three oil bunkers 3 through 5 can converge. The valve 201 is also located, in particular, below the oil bunkers 3 through 5 and, in particular, above the oil sump 2 such that oil can flow out of the oil bunkers 3 through 5 via the valve 201 directly into the oil sump 2.

The piston 204 of the channel body 203 has an outer lateral surface 205, which protrudes slightly radially from the remainder of the channel body 204 and seals an inner wall of the valve housing 202 with respect to the channel body 203. The outer lateral surface 205 of the piston 204, in the exemplary embodiment shown, has four piston openings, which form a first bunker port 206, a second bunker port 207, a third bunker port 208, and a fourth bunker port 209. The valve housing 201 has a lateral surface 210, which has a housing opening 211 at the level of the four piston openings 206 through 209. The housing opening 211 is connected to the at least one oil bunker 3 through 5 on the outer side of the lateral surface 210. On the inner side of the lateral surface 210, the housing opening 211 can be connected to at least one of the piston openings 206 through 209.

With respect to the height, the housing opening 211 extends over all four bunker ports 206 through 209. With respect to the width, the housing opening 211 extends approximately over a single one of the bunker ports 206 through 209, which, in the exemplary embodiment shown, are designed to be circular and have the same diameter. In the exemplary embodiment shown, the four bunker ports 206 through 209 are arranged offset with respect to one another in the longitudinal direction and in the circumferential direction of the piston 204. The four bunker ports 206 through 209 are therefore located at different heights, wherein the first bunker port 206 is arranged closest to the top and the remaining three bunker ports 207 through 209 are arranged farther down, spaced apart from one another.

Due to the offset of the bunker ports 206 through 209 with respect to one another in the circumferential direction, all four bunker openings 206 through 209 are never simultaneously located in the area of the housing opening 211. Instead, only the second bunker port 207 (nearly completely) and the third bunker port 208 (only to a small extent) are located in the area of the housing opening 211 as a function of a relative rotational position of the piston 204 with respect to the valve housing 202 according to FIG. 5. By turning the bunker ports 206 through 207, therefore, a different opening (rising/falling) to the oil bunkers 3 through 5 and, thus, different oil levels in the oil bunkers 3 through 5 can be set, which takes place as a function of the temperature.

The channel body 203 in the exemplary embodiment shown is a hollow turned part and has a longitudinal bore 212, which extends through the entire channel body 203 and connects a lower end face 213 of the hollow cylindrical channel body 203 to an upper end face 214 of the hollow cylindrical channel body 203. On the lower end face 213, the longitudinal bore 212 forms a sump port 215, which is connected to the oil sump 2. Each of the four bunker ports 206 through 209 is connected to the longitudinal bore 212, which therefore forms an oil duct, which connects the four bunker ports 206 through 209 to the central sump port 215. On the upper end face 214, the channel body 203 fits over a manufactured edge 216 of the valve housing 201 and, thus, closes the opening to a spring chamber. On the lower end face 213, the channel body 203 fits over a plug 217 of the valve housing 202 and can turn in the axially fixed position. The plug 217 has a central circular opening 218, which is aligned with the sump port 215 of the channel body 203 such that oil can flow out of the longitudinal bore 212 via the sump port 215 and the opening 218 into the oil sump 2.

The valve housing 202 is also a hollow turned part having openings on both end faces. On the upper end face, an opening of the valve housing 202 has a slightly smaller diameter than an inner diameter of the channel body 203 and is manufactured with the above-described edge 216, which holds the channel body 203 in place from the inside. Therefore, the through-flow as well as the mounting of the channel body 203 are secured. On the lower end face, the valve housing has an internal thread, which corresponds to an external thread of the plug 217.

The valve 210 includes a lower bimetal spring 219 and an upper bimetal spring 220. The bimetal springs 219, 220 in the exemplary embodiment shown are cylindrical springs. The two bimetal springs 219, 220 are of equal size and operate in opposite directions. The lower bimetal spring 219 is wound around the channel body 203 under the piston 204. The upper bimetal spring 220 is wound around the channel body 203 above the piston 204. Due to this winding, the effect of dirt is minimized and a contact surface (temperature transfer) to the channel body and to the oil is optimized.

An inflow out of the oil bunkers 3 through 5 takes place via the common housing opening 211 of the valve housing 202. On the upper end face, the valve 201 has an overflow function (end-face openings of the valve housing 202 and of the channel body 203). Oil out of the oil bunkers 3 through 5 can be drained into the oil sump 2 via the housing opening 211, at least one bunker port 206 through 209 located in the area of the housing opening 211, the sump port 215, and the opening 218 in the plug 217. An oil level is thermally adapted by the two bimetal springs 219, 220.

The oil level sets in depending on the rotation angle of the piston 204. The turning of the piston 204 takes place in a temperature-dependent manner via the bimetal springs 219, 220, the ends of which are respectively connected to the piston 204 and to the valve housing 202. Due to the filling of the channel body 203 with the piston 204, the two bimetal springs 219, 220 are heated or cooled and, thus, turn the piston 204. In conjunction with the turning motion, the connection to the oil bunkers 3 through 5 opens by way of the bunker ports 206 through 209 in the piston 204 being adapted to the housing opening 211 of the valve housing 202 to the bunkers. The oil level can also be set as the opening of the piston 204 increases. When the oil within the channel body 203 cools down, the bimetal springs 219, 220 contract again and turn the piston 204 in the opposite direction of rotation such that other of the bunker openings 206 through 209 enter the area of the housing opening 211 and are connected to the bunkers 3 through 5.

The bimetal springs 219, 220 are configured, in particular, for temperature-dependently deforming such that the bimetal springs 219, 220 turn the piston 204 from a closed position into at least one open position and from the at least one open position back into the closed position. In the closed position, none of the bunker ports 206 through 209 is located in the area of the housing opening 211, i.e., the valve housing 202 covers all four bunker ports 206 through 209 such that oil does not flow out of the bunkers 3 through 5 via the valve 201 into the oil sump 2. This is the case, in particular, at high temperatures. In this case, the valve 201 is in a closed state. By contrast, the valve 201 is switched into one of the open states when, as temperatures increase, the bimetal springs 219, 220 are heated, expand, and turn the piston 204 into one of the open positions, wherein at least one of the bunker ports 206 through 209 is connected via the housing opening 211 to the three bunkers 3 through 5.

Figure 12:
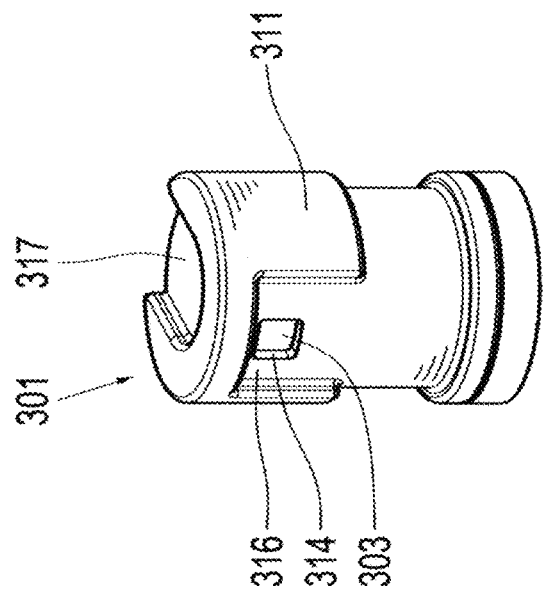
FIG. 12 shows a perspective representation of the valve according to FIG. 11.
Figure 11:
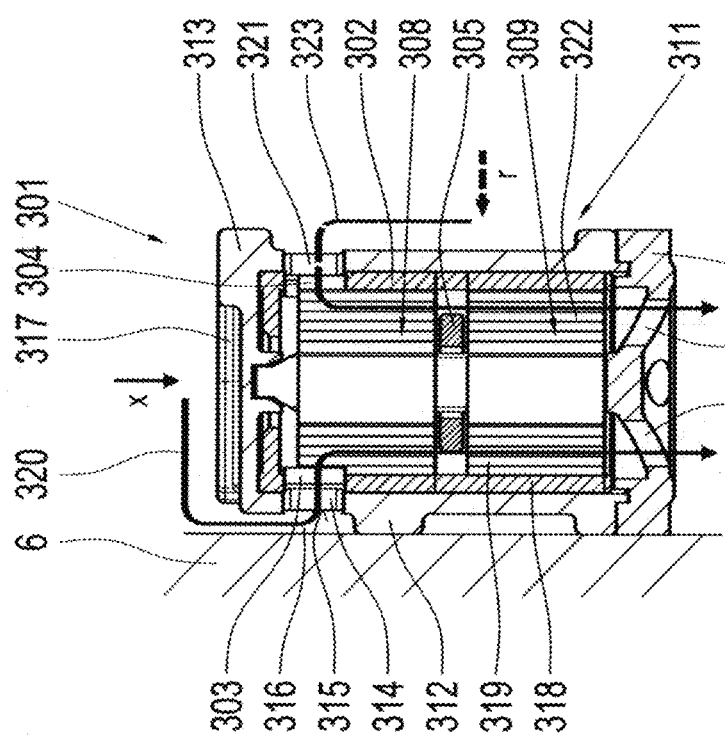
FIG. 11 shows a longitudinal sectional representation of a third exemplary embodiment of a valve for the transmission according to FIG. 1.
Figure 13:
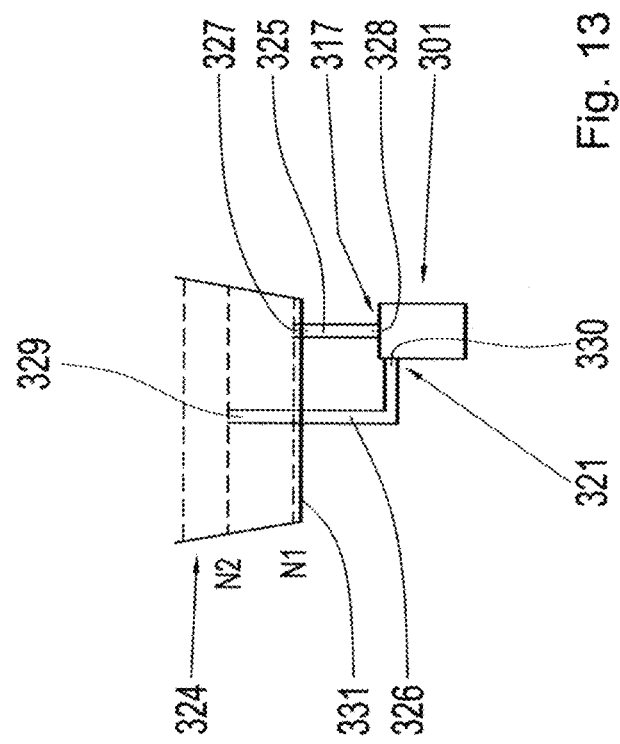
FIG. 13 shows a connection between the valve according to FIG. 11 and at least one of the bunkers according to FIGS. 1 through 3.

FIGS. 11 through 13 show an alternative valve 301 for the temperature-dependent open-loop control of the amount of oil intermediately stored in the oil bunkers 3 through 5 according to FIGS. 1 through 3. Valve openings and connections, which are located at different levels, can be opened or closed as a function of a temperature within the transmission 1. Therefore, a defined amount of oil can be temperature-dependently conveyed out of the bunkers 3 through 5 into the oil sump 2, as described in greater detail in the following.

The valve 301 is installed, in the upright position of the valve 301, which is shown in FIGS. 11 through 13, into the transmission housing 6, in particular in a rotationally fixed manner. The transmission housing 6 is partially represented on the left side in FIG. 11. An installation site of the valve 301 is located, in particular, at a collection point at which drain lines of the three oil bunkers 3 through 5 can converge. The valve 301 according to FIGS. 11 through 13 includes, in the exemplary embodiment shown, in particular, a channel body 302, a first bunker port 303, a second bunker port 304, a spacer ring 305, a first sump port 306, a second sump port 307, a mechanical actuating element having an upper bimetal coil 308 and a lower bimetal coil 309, and a cover 310 and a valve housing 311.

The channel body 302 and the valve housing 311 are hollow cylindrically shaped, wherein the channel body 302 is rotatably accommodated within a cylindrical portion 312 of the valve housing 311. An upper cover 313 of the valve housing 311 is designed to be closed and forms, on the inner side, an upper axial stop for the channel body 302. A cylindrical portion 312 of the valve housing 311 has, on the upper end, a first housing opening 314 in the proximity of the cover 313. An outer lateral surface 315 of the cylindrical portion 312, jointly with the transmission housing 6, delimits an inflow duct 316, which is connected to the housing opening 314 on the one hand and, on the other hand, transitions into a recess 317 on the outer side of the cover 313. The recess 317 in the exemplary embodiment shown has the same width as the inflow duct 316 and extends over approximately two-thirds (⅔) of the outer surface of the cover 313.

A cylindrical portion 318 of the channel body 302 forms, at the level of the first housing opening 314, the first bunker port 303, which, in the exemplary embodiment shown, has the same shape and size as the first housing opening 314. FIG. 11 shows the cylindrical portion 318 of the channel body 302 in a first open position in which the first bunker port 303 is aligned with the first housing opening 314 and, thus, is connected to the first housing opening 314. The recess 317 in the cover 313 is connected to the three bunkers 3 through 5 such that oil out of the bunkers 3 through 5 impacts the recess 317 in the axial direction x and is directed to the first bunker port 303 via the recess 317, the inflow port 316, and the first housing opening 314. When the channel body 301 is in the first open position shown in FIG. 11, oil that is present at the first bunker port 303 enters a first oil duct 319 within the channel body 301. The first oil duct 319 is connected to the first sump port 306, which, in the exemplary embodiment shown, is formed through the lower cover 310, which closes the valve housing 311 on the lower end face. The oil can flow through the first oil duct 319 and exit the valve 301 via the first sump port 306 in the direction of the oil sump 2, which is connected to the first sump port 306. One possible direction of flow of the oil is indicated by a first flow arrow 320.

The cylindrical portion 318 of the channel body 302 can be turned from the first open position, which is shown in FIG. 11, into a closed position such that the first bunker port 303 is no longer aligned with the first housing opening 314 and, thus, is no longer connected to the first housing opening 314. In this case, the cylindrical portion 312 of the valve housing 311 closes the first bunker port 303 such that oil that is present at the first bunker port 303 does not enter the first oil duct 319 within the channel body 301, does not flow through the first oil duct 319, and does not exit the valve 301 via the first sump port 306 in the direction of the oil sump 2.

The cylindrical portion 312 of the valve housing 311 has, in the proximity of the cover 313, at the upper end, a second housing opening 321, which is arranged offset in the circumferential direction from the first housing opening 314 by approximately one hundred and eighty degrees (180°) in the exemplary embodiment shown. The cylindrical portion 318 of the channel body 302 forms, at the level of the second housing opening 321, the second bunker port 304, which, in the exemplary embodiment shown, has approximately the same shape and size as the second housing opening 321. In the first open position of the cylindrical portion 318 of the channel body 302 shown in FIG. 11, the second bunker port 304 aligns with the second housing opening 321 and, thus, is connected to the second housing opening 321. The second housing opening 321 is connected to the three bunkers 3 through 5 such that oil out of the bunkers 3 through 5 impacts the second housing opening 321 in the radial direction r and is present at the second bunker port 304. When the channel body 302 is in the first open position, oil that is present at the second bunker port 304 enters a second oil duct 322 within the channel body 301. The second oil duct 322 is connected to the second sump port 307, which, in the exemplary embodiment shown, is formed through the lower cover 310. The oil can flow through the second oil duct 322 and exit the valve 301 via the second sump port 307 in the direction of the oil sump 2, which is connected to the second sump port 307. One possible direction of flow of the oil is indicated by a second flow arrow 323.

The cylindrical portion 318 of the channel body 302 can be turned into the above-described closed position, wherein the second bunker port 304 is no longer aligned with the second housing opening 321 and, thus, is no longer connected to the second housing opening 321. When the cylindrical portion 318 of the channel body 302 is in the closed position, the cylindrical portion 312 of the valve housing 311 closes the second bunker port 304 such that oil that is present at the second bunker port 304 does not enter the second oil duct 322 within the channel body 301, does not flow through the second oil duct 322, and does not exit the valve 301 via the second sump port 307 in the direction of the oil sump 2.

The cylindrical portion 318 of the channel body 302 can be turned into an alternative second open position in which the cylindrical portion 312 of the valve housing 311 closes the first bunker port 303, but leaves the second bunker port 304 open. Therefore, oil that is present at the closed first bunker port 303 does not enter the first oil duct 319 within the channel body 301, does not flow through the first oil duct 319, and does not exit the valve 301 via the first sump port 306 in the direction of the oil sump 2. By contrast, oil that is present at the second bunker port 304 enters the second oil duct 322 within the channel body 301 via the open second bunker port 304, flows through the second oil duct 322, and exits the valve 301 via the second sump port 307 in the direction of the oil sump 2.

The cylindrical portion 318 of the channel body 302 is turned in a temperature-dependent manner via the two bimetal springs 308, 309. For this purpose, the bimetal springs 308, 309 are each fastened on the cylindrical portion 318, and, in fact, the upper bimetal spring 308 above the spacer ring 305 and the lower bimetal spring 309 below the spacer ring 305. The bimetal springs 308, 309 can expand as the temperature increases such that the bimetal springs 308, 309 turn the cylindrical portion 318 out of the first open position into the second open position, and out of the second open position into the closed position. Conversely, the bimetal springs 308, 309 can contract as the temperature decreases such that the bimetal springs 308, 309 turn the cylindrical portion 318 from the closed position into the second open position and from the second open position into the first open position.

FIG. 13 shows, by way of example, a single oil bunker 324, which, in the exemplary embodiment shown, can represent the entirety of the three bunkers 3 through 5, which are connected to one another. Two drain lines 325, 326 are provided in this configuration. A first drain line 325 has an input-side port 327, which is connected to the oil bunker 324, wherein an output-side port 328 of the first drain line 325 is connected, in the axial direction x of the valve 301, to the recess 317 of the valve 301. A second drain line 326 has an input-side port 329, which is connected to the oil bunker 324, wherein an output-side port 330 of the second drain line 326 is connected, in the radial direction r of the valve 301, to the second housing opening 321 of the valve 301.

The input-side port 327 of the first drain line 325 is arranged in the area of a base 331 of the oil bunker 324 at a first level N1. When the oil fill level or oil level within the oil bunker 324 exceeds the first level N1, oil enters the first drain line 325 via the input-side port 327 of the first drain line 325, flows through the first drain line 325, and exits this via the output-side port 328 in order to impact the recess 317 of the cover 313 in the axial direction x, flow through the inlet duct 316 and the first housing opening 314, and be present at the first bunker port 303.

The input-side port 329 of the second drain line 326 is arranged within the oil bunker 324 at a second level N2, which is situated above the first level N1. In the exemplary embodiment shown, the second level N2 is situated in the upper half of the oil bunker 324. When the oil fill level within the oil bunker 324 exceeds the second level N2, oil enters the second drain line 326 via the input-side port 329 of the second drain line 326, flows through the second drain line 326 and exits this via the output-side port 330 in order to impact the second housing opening 321 in the area of the valve 301 in the radial direction r, and be present at the second bunker port 304.

When the cylindrical portion 318 of the channel body 302 is in the first open position, which is shown in FIG. 11, both drain lines 325, 326 are open in the direction of the oil sump 2. The fill level in the oil bunker 324 drops to the first level N1. When the cylindrical portion 318 of the channel body 302 is in the second open position, the first drain line 325 is closed and the second drain line 326 is open. The fill level in the oil bunker 324 can then rise to the second level N2. When the cylindrical portion 318 of the channel body 302 is in the closed position, both drain lines 325, 326 are closed in the direction of the oil sump 2. The fill level in the oil bunker 324 can then rise to a level that is above the second level N2, for example, to a maximum level.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

| | Reference characters |
|---|---|
| r | radial direction |
| x | axial direction |
| N1 | level 1 |
| N2 | level 2 |
| 1 | transmission |
| 2 | oil sump |
| 3 | first oil bunker |
| 4 | second oil bunker |
| 5 | third oil bunker |
| 6 | transmission housing |
| 101 | valve |
| 102 | channel body |
| 103 | first bunker port |
| 104 | second bunker port |
| 105 | third bunker port |
| 106 | first sump port |
| 107 | second sump port |
| 108 | third sump port |
| 109 | mechanical actuating element (spiral spring) |
| 110 | rotary disk |
| 111 | closing base |
| 112 | outer lateral surface of the channel body |
| 113 | first indentation/oil duct |
| 114 | second indentation/oil duct |
| 115 | third indentation/oil duct |
| 116 | housing opening |
| 117 | lower end face of the channel body |
| 118 | fixation of spiral spring |
| 119 | first direction of rotation |
| 120 | second direction of rotation |
| 121 | upper closing surface of rotary disk |
| 122 | stop |
| 123 | overflow duct |
| 123' | alternative overflow duct |
| 124 | input-side port |
| 124' | alternative input-side port |
| 125 | output-side port |
| 125' | alternative output-side port |
| 126 | upper end face of channel body |
| 127 | O-ring |
| 201 | valve |
| 202 | hollow cylindrical valve housing |
| 203 | channel body |
| 204 | piston |
| 205 | outer lateral surface of piston |
| 206 | first piston opening/first bunker port |
| 207 | second piston opening/second bunker port |
| 208 | third piston opening/third bunker port |
| 209 | fourth piston opening/fourth bunker port |
| 210 | lateral surface of valve housing |
| 211 | housing opening of valve housing |
| 212 | longitudinal bore of channel body |
| 213 | lower end face of hollow cylindrical channel body |

-continued

| Reference characters | |
|---|---|
| 214 | upper end face of hollow cylindrical channel body |
| 215 | sump port |
| 216 | edge of valve housing |
| 217 | plug |
| 218 | plug opening |
| 219 | lower bimetal spring |
| 220 | upper bimetal spring |
| 301 | valve |
| 302 | channel body |
| 303 | first bunker port |
| 304 | second bunker port |
| 305 | spacer ring |
| 306 | first sump port |
| 307 | second sump port |
| 308 | upper bimetal coil |
| 309 | lower bimetal coil |
| 310 | cover |
| 311 | valve housing |
| 312 | cylindrical portion of valve housing |
| 313 | valve housing cover |
| 314 | first housing opening |
| 315 | outer lateral surface |
| 316 | inflow duct |
| 317 | recess in cover |
| 318 | cylindrical portion of channel body |
| 319 | first oil duct |
| 320 | first flow arrow |
| 321 | second housing opening |
| 322 | second oil duct |
| 323 | second flow arrow |
| 324 | overall oil bunker |
| 325 | first drain line |
| 326 | second drain line |
| 327 | input-side port of first drain line |
| 328 | output-side port of first drain line |
| 329 | input-side port of second drain line |
| 330 | output-side port of second drain line |

The invention claimed is:
1. A transmission (1) for a motor vehicle, comprising:
an oil sump (2);
at least one oil bunker (3 through 5) arranged separated from the oil sump (2); and
a valve (101; 201; 301) comprising a channel body (102; 203; 302), at least one sump port (106 through 108; 215; 306, 307), at least one bunker port (103 through 105; 206 through 209; 303, 304), and a mechanical actuating element (109; 219, 220; 308, 309),
wherein the at least one sump port (106 through 108; 215; 306, 307) comprises a first sump port (106) and a second sump port (107),
wherein the at least one bunker port (103 through 105; 206 through 209; 303, 304) comprises a first bunker port (103) and a second bunker port (104),
wherein the channel body (102; 203; 302) has at least one oil duct (113 through 115; 212; 319, 322), the at least one oil duct (113 through 115; 212; 319, 322) of the channel body (102; 203; 302) comprising a first oil duct (113) and a second oil duct (114),
wherein the at least one oil duct (113 through 115; 212; 319, 322) connects the at least one bunker port (103 through 105; 206 through 209; 303, 304) to the at least one sump port (106 through 108; 215; 306, 307),
wherein the mechanical actuating element (109; 219, 220; 308, 309) is configured for temperature-dependently deforming such that the mechanical actuating element (109; 219, 220; 308, 309) transfers the valve (101; 201; 301) from a closed state into at least one opened state,
wherein the at least one oil bunker (3 through 5) is connected to the oil sump (2) via the at least one bunker port (103 through 105; 206 through 209; 303, 304), the at least one oil duct (113 through 115; 212; 319, 322), and the at least one sump port (106 through 108; 215; 306, 307) when the valve (101; 201; 301) is in the at least one open state,
wherein the at least one oil bunker (3 through 5) is not connected to the oil sump (2) via the valve (101; 201; 301) when the valve (101; 201; 301) is in the closed state,
wherein the mechanical actuating element (109) is configured for deforming, when a first temperature is fallen below, such that the mechanical actuating element (109) transfers the valve (101) from the closed state into a first open state,
wherein the mechanical actuating element (109) is configured for deforming, when a second temperature is fallen below, such that the mechanical actuating element (109) transfers the valve (101) from the first open state into a second open state, the second temperature less than the first temperature,
wherein the at least one oil bunker (3 through 5) is connected to the oil sump (2) via the first bunker port (103), the first oil duct (113), and the first sump port (106) when the valve (101) is in the first open state, and
wherein the at least one oil bunker (3 through 5) is connected to the oil sump (2) via the second bunker port (104), the second oil duct (114), and the second sump port (107) when the valve (101) is in the second open state.

2. A transmission (1) for a motor vehicle, comprising:
an oil sump (2);
at least one oil bunker (3 through 5) arranged separated from the oil sump (2); and
a valve (101; 201; 301) comprising a channel body (102; 203; 302), at least one sump port (106 through 108; 215; 306, 307), at least one bunker port (103 through 105; 206 through 209; 303, 304), a mechanical actuating element (109; 219, 220; 308, 309), and a hollow cylindrical valve housing (311),
wherein the channel body (102; 203; 302) has at least one oil duct (113 through 115; 212; 319, 322),
wherein the at least one oil duct (113 through 115; 212; 319, 322) connects the at least one bunker port (103 through 105:206 through 209; 303, 304) to the at least one sump port (106 through 108; 215; 306, 307),
wherein the mechanical actuating element (109; 219, 220; 308, 309) is configured for temperature-dependently deforming such that the mechanical actuating element (109; 219, 220; 308, 309) transfers the valve (101; 201; 301) from a closed state into at least one opened state,
wherein the at least one oil bunker (3 through 5) is connected to the oil sump (2) via the at least one bunker port (103 through 105; 206 through 209; 303, 304), the at least one oil duct (113 through 115; 212; 319, 322), and the at least one sump port (106 through 108; 215; 306, 307) when the valve (101; 201; 301) is in the at least one open state,
wherein the at least one oil bunker (3 through 5) is not connected to the oil sump (2) via the valve (101; 201; 301) when the valve (101; 201; 301) is in the closed state,
wherein the channel body (302) is rotatably accommodated within the valve housing (311),
wherein the channel body (302) comprises a cylindrical portion (318) forming a first bunker port (303) and a second bunker port (304) of the at least one bunker port, wherein the channel body (302), in an interior of the channel body (302), forms a first oil duct (319) of the at least one oil duct that connects the first bunker port (303) of the at least one bunker port to a first sump port (306) of the at least one sump port, wherein the channel body (302), in the interior, forms a second oil duct (322) of the at least one oil duct that connects the second bunker port (304) of the at least one bunker port to a second sump port (307) of the at least one sump port, wherein the valve (301) is shaped such that oil out of the at least one oil bunker (3 through 5) impacting the valve (301) in the axial direction (x) is directed to the first bunker port (303), wherein the valve (301) is shaped such that oil out of the at least one oil bunker (3 through 5) impacting the valve (301) in the radial direction (r) is directed to the second bunker port (304), wherein the mechanical actuating element (308, 309) is configured for temperature-dependently deforming such that the mechanical actuating element (308, 309) turns the channel body (302) out of a closed position into at least one open position, wherein the valve (301) is in the closed state when the channel body (302) is in the closed position, the valve housing (311) covers both the first and second bunker ports (303, 304) such that neither of the first and second bunker ports (303, 304) is connected to the at least one bunker (3 through 5) and oil cannot flow out of the at least one bunker (3 through 5) via the valve (301) into the oil sump (2) when the channel body (302) is in the closed position, and wherein the valve (301) is in the at least one open state when the channel body (302) is in the at least one open position, the at least one bunker port (303, 304) is connected to the at least one bunker (3 through 5) via the valve housing (311) such that oil is flowable out of the at least one bunker (3 through 5) via the valve (301) into the oil sump (2) when the channel body (302) is in the at least one open position.

* * * * *